(12) United States Patent
Holmström et al.

(10) Patent No.: US 6,741,870 B1
(45) Date of Patent: May 25, 2004

(54) METHOD AND SYSTEM FOR SELECTING COMMUNICATION MEDIA

(75) Inventors: Jarl Tomas Holmström, Dalby (SE); Magnus Svensson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 420 days.

(21) Appl. No.: 09/678,137

(22) Filed: Oct. 4, 2000

(51) Int. Cl.[7] ............................................... H04M 1/00
(52) U.S. Cl. .................. 455/557; 455/426.1; 455/552.1
(58) Field of Search ................................. 455/556, 557, 455/41, 550, 575, 90, 554.2, 556.1, 556.2, 552.1, 553.1, 426.1

(56) References Cited

U.S. PATENT DOCUMENTS

| | | | |
|---|---|---|---|
| 4,004,277 A | | 1/1977 | Gavril ..................... 340/172.5 |
| 5,173,933 A | | 12/1992 | Jabs et al. ..................... 379/58 |
| 5,301,353 A | | 4/1994 | Borras et al. ................... 455/9 |
| 5,535,371 A | | 7/1996 | Stewart et al. ............... 395/500 |
| 5,553,245 A | | 9/1996 | Su et al. ..................... 395/284 |
| 5,737,690 A | * | 4/1998 | Gutman .......................... 455/8 |
| 5,768,542 A | | 6/1998 | Enstrom et al. ............. 395/284 |

| | | | |
|---|---|---|---|
| 2002/0065076 A1 | * | 5/2002 | Monroe ...................... 455/426 |

FOREIGN PATENT DOCUMENTS

| | | | |
|---|---|---|---|
| EP | 0 526 764 A2 | | 2/1993 |
| EP | 0 781 064 A2 | | 7/1996 |
| JP | 10051444 | | 2/1998 |
| WO | WO 94/17639 | * | 8/1994 ............ H04Q/7/04 |

OTHER PUBLICATIONS

EPO Search Report; Completed Jun. 12, 2001.

* cited by examiner

Primary Examiner—Lee Nguyen
(74) Attorney, Agent, or Firm—Jenkens & Gilchrist, P.C.

(57) ABSTRACT

A method and system are disclosed whereby one or more communication devices can automatically switch between physical communication interfaces on an as needed basis. A first (sending) device attempts to initiate communications with another device using one interface at a time. These attempts are made in accordance with a predetermined priority list. If the second device responds to any such interface selected, a communication "channel" is then set up. Once such a channel is set up, the devices can use the channel to negotiate for use of one of the other communication interfaces, if necessary. If the communication is interrupted inadvertently, either device can attempt to reinitiate the communication in accordance with the priority list.

27 Claims, 1 Drawing Sheet

METHOD AND SYSTEM FOR SELECTING COMMUNICATION MEDIA

BACKGROUND OF THE INVENTION

1. Technical Field of the Invention

The present invention relates in general to the telecommunications field and, in particular, to a method for automatically selecting an appropriate physical communication interface for use in facilitating communications between at least two communication devices.

2. Description of Related Art

Many of the communication devices used in existing communication systems include a plurality of physical communication interfaces such as, for example, wire-bound (e.g., cable), wireless, radio (e.g., Bluetooth) and/or Infrared (e.g., IrDA) interfaces. Examples of such communication devices are mobile radiotelephones, Personal Digital Assistants (PDAs), and portable computers. As such, the term "communication device" includes electronic equipment such as portable radio communication equipment. The term "portable radio communication equipment" includes such equipment as mobile telephones, mobile radio terminals, communicators (e.g., electronic organizers), smart phones, and pagers.

As such, in order for any two of these devices to communicate with each other, the appropriate physical interface(s) has to be selected as a medium for facilitating the communications therebetween. In order to facilitate the selection of an appropriate physical interface, the existing systems typically display some type of menu with different selection settings. Consequently, a user can select a physical communication interface from the menu, which is to be used for communicating with another device.

A significant problem that needs to be resolved for existing and future communication systems is that as the number and type of physical communication interfaces available for use between devices continues to grow, users are finding it more difficult to determine beforehand whether communications are actually possible over the physical communication interfaces they prefer to use. In other words, although users may know that a menu setting can be used to select or switch between interfaces, the users are finding it more difficult to determine precisely what settings to use. Furthermore, once a user has chosen a particular physical communication interface (e.g., IrDA interface) for use in communicating with another device, all other available interfaces are disabled until a different menu setting is selected.

Similarly, by way of example, when data is being transferred over a particular type of interface (e.g., an IrDA interface) in most systems, other types of interfaces (e.g., wire-bound interfaces) are intentionally disabled. In fact, a wire-bound interface can even remain disabled after the data has been completely transferred. Consequently, for this example, in order for the device to be able to re-establish communications over the wire-bound interface, the interface must be manually activated (selected) by the user.

The majority of users are typically not interested in being required to manually select which communication interfaces to use. Instead, most users want to be able to select the device(s) with which they can communicate. For example, a user may want to synchronize Personal Information Manager (PIM) data between the user's mobile phone and a portable computer. In any event, a significant problem with the existing communication systems in this regard is that they do not provide any method for automatically selecting the appropriate communication interface(s) to use. Nevertheless, as described in detail below, the present invention successfully resolves the above-described problem and other related problems.

SUMMARY OF THE INVENTION

In accordance with an embodiment of the present invention, a method and system are provided whereby one or more communication devices can automatically switch between physical communication interfaces on an as needed basis. A first device attempts to initiate communications with another device using one physical communication interface at a time. For this embodiment, these attempts are made in accordance with a predetermined priority list. Once the second device responds to any interface thus selected, a normal communication "channel" is then set up between the devices via that interface. Albeit, once such a channel is set up for communications, a device can also use that channel to negotiate the use of another communication interface, if necessary. If the ongoing communications between two such devices are interrupted inadvertently, either device can attempt to reinitiate the communications in accordance with the priority list.

For secure operation: When two devices "initiate" communications with each other, they exchange unique communication channel IDs. If contact is lost, the devices attempt to re-establish communications. During this process, the communication channels are requested to authenticate the other party. If the communications cannot be established, or if the communication channel IDs are not recognized by any of the parties, the attempt to re-establish communications may be aborted (possibly after a number of retries).

An important technical advantage of the present invention is that a user can be relieved of the cumbersome task of having to manually switch between physical communication interfaces.

Another important technical advantage of the present invention is that by providing a method for automatically selecting between physical communication interfaces, the usability of such devices having a plurality of physical communication interfaces to use is significantly improved.

It shall be emphasized that the terms "comprises" or "comprising" as used in this specification are meant to specify the presence of stated features, integers, steps or components, but do not preclude the presence or addition of one or more other features, integers, steps, components or groups thereof.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
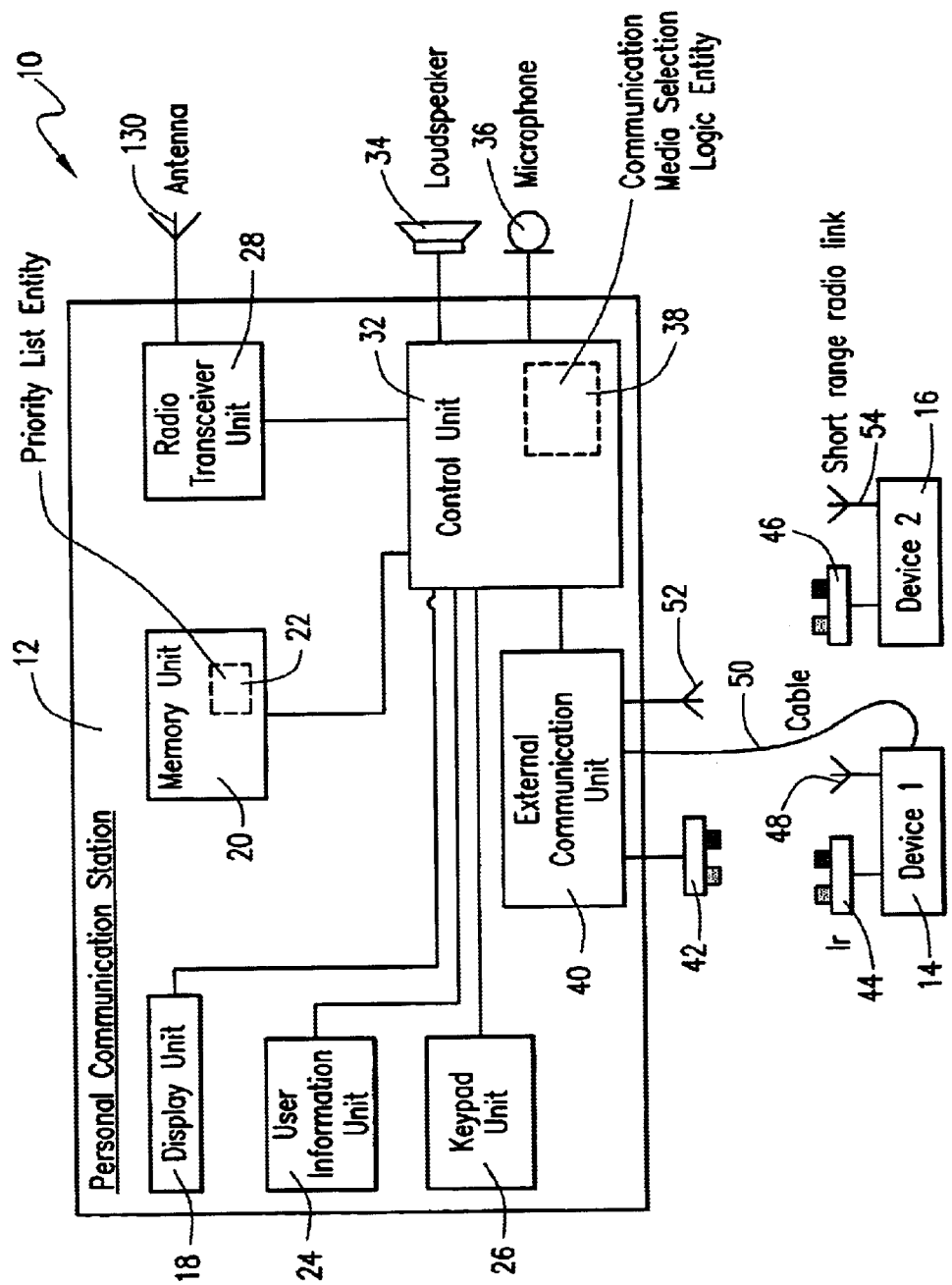
FIG. 1 is a block diagram of a communication system which can be used to implement an embodiment of the present invention.

The preferred embodiment of the present invention and its advantages are best understood by referring to FIG. 1 of the drawings. Essentially, in accordance with an embodiment of the present invention, a method and system are provided whereby one or more communication devices can automatically switch between physical communication interfaces on an as needed basis. A first (sending) device attempts to initiate communications with another (receiving) device using one interface at a time. For this embodiment, these attempts are made in accordance with a predetermined priority list. Once the second device responds to any such interface selected, a communication "channel" is then set up. Once such a channel is set up, a device can use the channel to negotiate for the use of another communication interface, if necessary. If the communications are interrupted inadvertently, either device can attempt to reinitiate the communication in accordance with the priority list.

Specifically, FIG. 1 is a block diagram of a communication system 10, which can be used to implement an embodiment of the present invention. For this exemplary embodiment, the system 10 includes a Personal Communication Station 12. Notably, although a Personal Communication Station 12 is shown, this apparatus is described herein for illustrative purposes only and to support the present method for selecting between multiple physical communication interfaces. As such, the exemplary system shown in FIG. 1 is not intended to limit the present invention, and any appropriate apparatus that can be used to implement the present method for automatically selecting between interfaces can be covered by the present invention.

Referring again to FIG. 1, the exemplary system 10 also includes a first communication device 14 and a second communication device 16. Notably, although only two such communication devices are shown, this arrangement is shown for illustrative purposes, and a typical communication system such as system 10 can include a number of such communication devices. However, a typical scenario is that no more than two communication devices communicate together at any one time. As such, for this embodiment, the Personal Communication Station 12 can also be considered as a communication device.

Returning to the Personal Communication Station 12 in FIG. 1, a display unit 18 is shown. Such a display unit (e.g., a monitor for a Personal Computer or a mobile phone display) can provide a video image and/or text display for a user. The display unit 18 is connected to a control unit 32 for transfer of control data and other communications therebetween. The Personal Communication Station also includes a memory unit 20 (e.g., including Random Access Memory and/or mass storage such as a hard drive), a user information unit 24 (e.g., providing information useful to a user of the Personal Communication Station), a keypad unit 26 (e.g., for inputting user commands), a loudspeaker 34 and microphone 36. Each unit (20, 24, 26) is respectively connected to the control unit 32 for transfer of control data and other communications therebetween. The microphone and loudspeaker are for speech communications by the user of the Personal Communication Station.

The Personal Communication Station 12 shown also includes a radio transceiver unit 28 and an external communication unit 40. The radio transceiver unit 28 and external communication unit 40 are respectively connected to the control unit 32 for transfer of control data and other communications therebetween. The radio transceiver unit 28 is also connected to a transmit/receive antenna 30. For this exemplary embodiment, the radio transceiver unit 28 (and Personal Communication Station 12) can be connected to a mobile communications network via the antenna 30 and an appropriate radio air interface. As such, the Personal Communication Station 12 can be a fixed or mobile terminal operating in, for example, a Global System for Mobile Communications (GSM) network, a Digital-Advanced Mobile Phone System (D-AMPS) network, a Personal Digital Communication (PDC) system network, a Code Division Multiple Access (CDMA) or Wideband-CDMA (W-CDMA) network, or other networks in the so-called 3rd Generation System.

For this embodiment, a major function of the external communication unit 40 is to implement and maintain communications with external communication devices such as devices 14 and 16, under the control of the control unit 32. As such, the external communication unit 40 can communicate with an external communication device via a communications interface, such as, for example, a wirebound connection (e.g., via cable 50), an infrared (e.g., IrDA) connection (e.g., via infrared transmitter/detectors 42, 44 or 46), or a short range radio link (e.g., via antennas 48, 52 or 54).

A section 22 of the memory area in the memory unit 20 contains a listing of priority information. For this exemplary embodiment, this priority information is used to determine an order for initiating communications between devices using one communications interface at a time. For example, a priority listing 22 can give a highest level of priority to the use of a wireless radio link, a lower priority to the use of an infrared link, and the lowest priority to a wirebound link.

Alternatively, the priority listing 22 can provide a priority for the use of specific communication interfaces. For example, the highest priority level can be given to the use of the interface associated with antenna 52 and 48, and a lower level of priority can be given to the use of the interface associated with the infrared transmitter/detector 44, etc. As such, in accordance with a setting associated with the priority Ad 10 listing 22, a logic circuit 38 in the control unit 32 generates one or more control messages, which are used to order the external communication unit 40 to select the communication interfaces in the specified (priority) order, in an attempt to initiate communications with an external communications device (e.g., 14 or 16). The logic circuit 38 can be implemented in circuit form (e.g., ASIC), and/or by software executed by a processor associated with the control unit 32. Notably, the present invention can also be implemented with respect to an external device (e.g., device 14 or 16 can select a physical communication interface to use, in accordance with a priority list).

For this exemplary embodiment, once a communications interface is selected which responds appropriately to the attempt to initiate communications with an external device, the logic circuit 38 generates a control message for the external communication unit 40 to setup a connection via the selected interface.

Illustrating an exemplary operation, assume that a user of the Personal Communication Station 12 desires to communicate with a user of an external device (e.g., the first device 14). The user of the Personal Communication Station views a menu of selection options via the display unit 18. The menu information is retrieved from the memory unit 20 by the control unit 32, and conveyed to the display unit. The user of the Personal Communication Station then inputs a selection (e.g., setup a connection with the first device 14) to the control unit 32 via the keypad unit 26.

In response to the input selection, the control unit 32 retrieves a priority list from the memory area 22 in the memory unit 20. For this embodiment, the priority list provides a sequence or ordering to be followed by the communication media selection logic unit 38 while selecting a physical communication interface for communications with the selected device (14). According to the priority list, the control unit 32 (via the logic unit 38) sends a control message to the external communication unit to attempt to initiate a connection with the first device 14 via a specific physical communication interface. For example, if the connection is to be for a speech connection (e.g., a telephone call), the first priority for an interface to use can be for a short range radio link (e.g., 52) connection.

If the connection attempt using the short range radio link is successful (e.g., a connection is made with the short range radio link 48), then an appropriate channel connection is made between the external communication unit 40 and the first device 14 via the two interfaces used (48, 52). The users can then communicate with each other via the channel connection.

On the other hand, if the first connection attempt using the short range radio link is unsuccessful (as reported by the external communication unit to the logic unit), then the logic unit 38 attempts to setup another connection using the next interface determined by the priority list. For example, the control unit 32 sends a message to the external communication unit 40 to initiate a speech connection with the first device 14 using a wirebound interface (e.g., 50). If this second connection attempt is unsuccessful, then the logic unit 38 attempts to setup a third connection (e.g., using an infrared interface 42) in accordance with the priority list, and so on.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A system for automatically selecting communication media, comprising:
   a first communication device;
   a second communication device;
   a plurality of communication interfaces;
   a communication interface selection unit coupled to said first communication device, such that said communication interface selection unit selects a communication interface of said plurality of communication interfaces so as to couple communications between said first communication device and said second communication device, said communication interface selection unit further comprising storage means for storing communication interface priority list information, the priority list information comprising a priority ordering for selecting said communication interface of said plurality of communication interfaces in a predetermined order; and
   wherein said communication interface selection unit selects said communication interface of said plurality of communication interfaces in a predetermined order in accordance with the priority list information; and
   wherein said first communication device is associated with a first communication channel identifier, and said second communication device is associated with a second communication channel identifier, such that when said communications between said first communication device and said second communication device is initiated, said first and second communication devices exchange said communication channel identifiers.

2. The system of claim 1, wherein said first communication device comprises a personal communication station.

3. The system of claim 1, wherein said first communication device comprises a mobile telephone.

4. The system of claim 1, wherein said first communication device comprises a Personal Digital Assistant (PDA).

5. The system of claim 1, wherein said first communication device comprises a portable computer.

6. The system of claim 1, wherein at least one of said plurality of communication interfaces comprises an infrared communication interface.

7. The system of claim 1, wherein at least one of said plurality of communication interfaces comprises a wireless interface.

8. The system of claim 1, wherein at least one of said plurality of communication interfaces comprises a wireline interface.

9. The system of claim 1, wherein at least one of said plurality of communication interfaces comprises a radio interface.

10. The system of claim 1, wherein at least one of said plurality of communication interfaces comprises a data communication interface.

11. The system of claim 1, wherein at least one of said plurality of communication interfaces comprises a speech communication interface.

12. The system of claim 1, wherein at least one of said plurality of communication interfaces comprises a physical communication interface.

13. The system of claim 1, wherein said storage means further comprises means for storing communication media selection logic.

14. The system of claim 1, further including means for attempting to re-establish said communications between said first communication device and said second communication device if said communications cannot be maintained, performing an authentication using at least one of said communication channel identifiers, and aborting said attempt to re-establish said communications if said authentication is unsuccessful.

15. A method for automatically selecting communication media, comprising the steps of:
   connecting a first communication device to a communication interface selection unit;
   said communication interface selection unit selecting a communication interface of a plurality of communication interfaces;
   said communication interface selection unit storing communication interface priority list information, the priority list information comprising a priority ordering for selecting said communication interface of said plurality of communication interfaces in a predetermined order; and
   coupling communications between said first communication device and a second communication device via said selected communication interface;
   associating said first communication device with a first communication channel identifier:
   associating said second communication device with a second communication channel identifier; and
   said first and said second communication devices exchanging said first and second communication channel identifiers during the coupling step; and
   wherein the step of selecting a communication interface of a plurality of communication interfaces further comprises selecting said communication interface in a predetermined order in accordance with the priority list information.

16. The method of claim 15, wherein said first communication device comprises a personal communication station.

17. The method of claim 15, wherein said first communication device comprises a mobile telephone.

18. The method of claim 15, wherein said first communication device comprises a Personal Digital Assistant (PDA).

19. The method of claim 15, wherein said first communication device comprises a portable computer.

20. The method of claim 15, wherein at least one of said plurality of communication interfaces comprises an infrared communication interface.

21. The method of claim 15, wherein at least one of said plurality of communication interfaces comprises a wireless interface.

22. The method of claim 15, wherein at least one of said plurality of communication interfaces comprises a wireline interface.

23. The method of claim 15, wherein at least one of said plurality of communication interfaces comprises a radio interface.

24. The method of claim 15, wherein at least one of said plurality of communication interfaces comprises a data communication interface.

25. The method of claim 15, wherein at least one of said plurality of communication interfaces comprises a speech communication interface.

26. The method of claim 15, wherein at least one of said plurality of communication interfaces comprises a physical communication interface.

27. The method of claim 15, further comprising the steps of:

attempting to re-establish said communications between said first communication device and said second communication device if said communications cannot be maintained;

performing an authentication using at least one of said communication channel identifiers; and aborting said attempt to re-establish said communications if said authentication is unsuccessful.

* * * * *